(12) United States Patent
Chhabra et al.

(10) Patent No.: US 11,290,461 B1
(45) Date of Patent: Mar. 29, 2022

(54) UNBLOCKING COMPUTER RESOURCE USAGE COUNT

(71) Applicant: Amazon Technologies, Inc., Seattle, WA (US)

(72) Inventors: Jasmeet Chhabra, Sammamish, WA (US); Dan Popick, Seattle, WA (US); Zaid Abu Ziad, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 274 days.

(21) Appl. No.: 16/457,245

(22) Filed: Jun. 28, 2019

(51) Int. Cl.
  *G06F 15/173* (2006.01)
  *H04L 29/06* (2006.01)
  *H04L 67/306* (2022.01)

(52) U.S. Cl.
  CPC ............ *H04L 63/102* (2013.01); *H04L 63/20* (2013.01); *H04L 67/306* (2013.01)

(58) Field of Classification Search
  CPC . H04L 41/0893; H04L 41/0681; H04L 43/16; H04L 51/12; H04L 63/10; H04L 63/101; H04L 67/22
  USPC ...................... 709/223, 226, 227, 229; 726/4
  See application file for complete search history.

(56) References Cited

U.S. PATENT DOCUMENTS

2016/0255142 A1* 9/2016 Hunt ................... H04L 67/1093 709/223
2017/0180378 A1* 6/2017 Tyler ..................... H04L 63/083

* cited by examiner

*Primary Examiner* — Wing F Chan
*Assistant Examiner* — Andrew Woo
(74) *Attorney, Agent, or Firm* — Eversheds Sutherland (US) LLP

(57) ABSTRACT

Systems, devices, and methods are provided for unblocking a computer resource usage count. A system may receive a request for a user account and a user account policy, and may obtain a count of a first number of user accounts, wherein the count is based on an aggregation of two or more actions associated with the user account policy. The system may determine, based on the count, that the first number of user accounts is less than a threshold number of accounts. The system may obtain based on the determination that the first number of user accounts is less than the threshold number of accounts, an event history. The system may determine, based on the event history, a second number of user accounts. The system may determine that the second number of user accounts is less than the threshold number of accounts, and may update the user account policy.

20 Claims, 9 Drawing Sheets

UNBLOCKING COMPUTER RESOURCE USAGE COUNT

BACKGROUND

Cloud computing resources, services, and systems are increasingly being leveraged by individuals and organizations due to the ease, cost benefits, and flexibility in usage associated with the cloud. Many of the cloud's key benefits, such as rapid elasticity, on-demand provisioning, and high availability are very appealing to a wide range of customers. Increasing requests to add and remove user accounts to policies and roles allowing user accounts to access cloud computing resources may result in processing delays and violations of user account limits.

Figure 1:
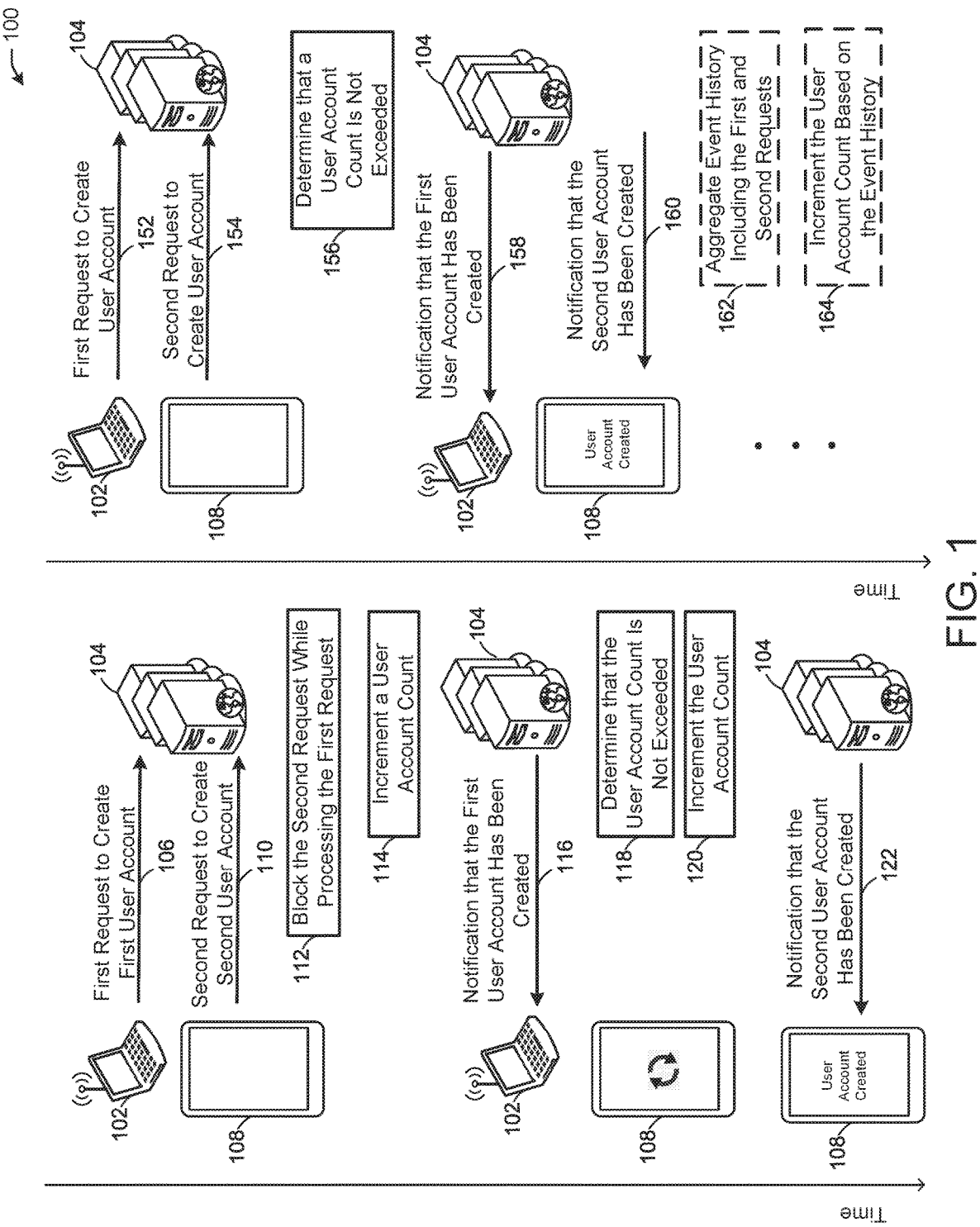
FIG. 1 illustrates an example process for unblocking a computer resource usage count, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for unblocking a computer resource usage count.

Remote computing resources may use quotas limiting numbers of user accounts having roles and rights defined by policies. For example, a quota may limit the number of users having access to remote computing resources. A database may maintain account information, including which accounts have access to remote computing resources. To enforce a quota, a count of users having access or a role may be incremented when a new user account is granted access or a role up until the number of user accounts reaches the quota or reaches a threshold that is a number of accounts from the quota. When adding a new account to a group of accounts with a role or access to a computer resource would result in a number of accounts having the role or access exceeding the quota (e.g., a threshold number of accounts), the granting of a role or access may be prevented. However, when requests to add multiple user accounts may result in exceeding a quota (e.g., 499 accounts are attached to a role with a quota of 500 accounts, and two additional accounts are requested to be added to the role), the requests may be competing with one another, and may need to be processed in a serialized manner (e.g., one request is locked out until the other request is processed and the quota is updated).

When a policy is attached to one or more accounts, and a user requests a change to or deletion of the policy, whether the policy change or deletion is allowed may be based on whether the policy is attached to a threshold number of accounts (e.g., only delete a policy when the number of accounts attached to the policy is less than a threshold number of accounts). However, before deleting a policy or performing another type of sensitive action, an updated count of attached accounts may be useful in determining whether performance of the sensitive action may result in a wait time to determine whether performance of the action would impact a number of accounts exceeding a threshold number of accounts.

In particular, one or more process flows may be implemented by a remote computing system to process requests related to user accounts. When the remote computing system receives requests to add new accounts, the remote computing system may implement a process flow which retrieves a count of a current number of active accounts. When the count is exceeded, the request for a new account may be denied. When the count is not yet exceeded, the count of currently active accounts may increment before the process flow ends. In this manner, a database or other storage which hosts the count may be temporarily locked from access and editing by one request while processing another request (e.g., implementing a process flow).

Therefore, remote computing systems may benefit from reducing the wait time to process requests for actions associated with user roles, policies, and resource access and from reducing the situations when an updated count of accounts for a policy is needed.

In one or more embodiments, a remote computing system may achieve the above-described benefits by relying on eventually consistent counts in some situations and relying on strongly consistent counts in other situations. An eventually consistent count may refer to a process which allows time to update any node which stores data. For example, a master database may store a count of active accounts for a group of accounts having a particular role (e.g., administrator, read/write access, etc.). A replica database or other storage may maintain the count. When the count is updated in one location, the update may need to be propagated to the other location so that when the count information is accessed at the other location, the count access is updated. Eventual consistency may allow for some delay in propagating updates to different locations, resulting on the possibility that some requests for information may result in outdated information until the update has been propagated. In contrast, strong consistency may refer to immediate propagation of information to all associated locations as soon as an update is made in one location. To prevent the dissemination of outdated information while an update is being propagated, a strongly consistent count may require a system to prevent (e.g., block) access to the information in one location until the information has been updated. Therefore, strong consistency provides more accurate, updated information, but often with more latency than use of eventual consistency. Accordingly, a remote computing system may apply a strongly consistent count in limited circumstances to reduce latency associated with updated information and retrieving updated information in response to requests, for example.

In one or more embodiments, a remote computing system may implement an eventually consistent count of user accounts except when evaluating requests for performance of sensitive actions (e.g., policy deletion, addition of a group, deletion of a group, etc.). Using an eventually consistent count may allow for processing account requests without requiring retrieval and evaluation of a count of user accounts in response to every request to add or remove a user, role, or policy (e.g., to/from an account). As such, the lag time for processing such requests may be reduced (e.g., by avoiding locking a resource until a request has been fully processed). To avoid performance of sensitive actions, the remote computing system may implement a strongly consistent count in response to certain requests such as deleting a role, user, or policy. An action may become sensitive when the count reaches a threshold number of accounts from a quota. For example, if a quota limits a policy to 500 accounts, when the count reaches a threshold number of accounts (e.g., 495 accounts), an action which may add to the count may be considered sensitive because the action may result in the count exceeding a quota.

In one or more embodiments, when using an eventually consistent account, a remote computing system may read an event stream (e.g., including information regarding requests), and may aggregate the results of requested events to update respective counts of user accounts. In this manner, the number of write requests/locks may be reduced by removing the count updating (e.g., propagation) from the process flow associated with performing an account action.

In one or more embodiments, a remote computing system may identify a type of request being made as a sensitive action. When the action or active programming interface used to receive a requested action is identified as sensitive, the remote computing system may determine whether the count of user accounts for a role or policy is less than a threshold number of accounts. The threshold number of accounts being below the threshold number of accounts may be indicative of a small number of accounts being affected by the requested action (e.g., a policy deletion). When too many accounts may be affected by a requested action that is deemed sensitive, the remote computing system may deny the request. When a small enough number of accounts may be affected, the remote computing system may use a strongly consistent count to determine whether the most updated count will allow for the action to be performed. For example, the remote computing system may check for pending actions to consider when updating the count before determining whether a request would violate or comply with the count. In this manner, the delay that may be associated with using a strongly consistent count may be incurred only when a count is near zero so that the performance impact of processing account requests is minimized.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example process 100 for unblocking a computer resource usage count, in accordance with one or more example embodiments of the present disclosure.

Referring to FIG. 1, the process 100 may include a user device 102 communicating with a remote computer 104. At step 106, the user device 102 may send a first request to create a first user account to the remote computer 104. The remote computer 104 may receive multiple requests from multiple user devices, such as user device 108, to create user accounts, remove user accounts, add user accounts to a policy or role, remove user accounts from a policy or role, create policies or roles, remove policies or roles, and the like. At step 110, the user device 108 may send a second request to create a second user account to the remote computer 104. While processing the first request to create the first user account, the remote computer 104 may determine whether a quota or limit on user accounts permits the creation of additional user accounts. While evaluating whether additional user accounts may be created, the remote computer 104 at step 112 may block the second request (e.g., from accessing a count of current user accounts), so the user device 108 may have to wait while the remote computer 104 serially processes the first request before processing the second request. At step 114, the remote computer 104 may determine that the first user account may be created and may increment a user account count (e.g., a counter of a number of active user accounts) to reflect the updated number of user accounts. At step 116, the remote computer 104 may send to the user device 102 a notification that the first user account has been created. Once the first user account request has been processed, the remote computer 104 may process the second user account request. At step 118, the remote computer 104 may determine that the user account count, after being updated with the first user account, is not exceeded (e.g., does not exceed a quota or limit). At step 120, the remote computer 104 may create the second user account and increment the user account count to reflect the updated count of user accounts. At step 122, the remote computer 104 may send to the user device 108 a notification that the second user account has been created.

Still referring to FIG. 1, the process 100 may avoid the blocking and waiting applied to the user device 108. At step 152, the user device 102 may send a first request to create a first user account to the remote computer 104. At step 154, the user device 108 may send a second request to create a second user account to the remote computer 104. Instead of blocking the second request while processing the first request so that the processing of the second request uses an updated count reflecting whether the first user account was created, the remote computer 104 may process both the first and second requests, creating the first and second user accounts without updating the user account count. For example, at step 156, the remote computer 104 may determine (e.g., in response to both the first and second account requests) that the user account count (e.g., which may not be updated to reflect recent account requests) is not exceeded, and may create the first and second user accounts. The count may be a quota limiting a number of accounts, or may be a threshold less than the quota (e.g., a threshold of 495 accounts when the quota is 500 accounts, allowing the use of a strongly consistent count when the count is exceeded to make sure the count does not exceed the quota). At step 158, the remote computer may send to the user device 102 a notification that the first account has been created. At step 160, the remote computer 104 may send to the user device 108 a notification that the second account has been created. To make sure that the user account count is eventually updated to reflect the creation of the two new user accounts (e.g., using an eventually consistent count), the remote computer 104 may, at step 162, aggregate event history that includes indications of actions taken with respect to adding or removing accounts, such as the actions to add the first and second user accounts. At step 164, the remote computer 104 may adjust the user account count based on the event history (e.g., increment the count to reflect the addition of the two user accounts).

In one or more embodiments, the remote computer 104 may allow parallel processing of some requests associated with user accounts, roles, and policies. The parallel processing may be facilitated by not having to update the user account count in response to the addition of an account to or the subtraction of an account from a role or policy. For example, a role may be an identity (e.g., administrator or a user) having certain permissions (e.g., reading, writing, etc.). A role may provide a user account with security credentials for a particular role session rather than for long-term use. Roles may be used to allow temporary access to computer resources. A policy may be an entity that, when attached to a user account or computer resource, may define the permissions of the user account. When multiple requests to attach or remove accounts to or from roles or policies are received by the remote computer 104, the remote computer 104 may process the requests and later update the count based on an aggregation of multiple requests processed since the most recent count update, as described further herein.

In one or more embodiments, the user device 102 and the user device 108 may include any suitable processor-driven device including, but not limited to, a mobile device or a non-mobile (e.g., a static) device. For example, the user device 102 and the user device 108 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

In one or more embodiments, the user device 102 and the user device 108 may access remotely stored and managed computer resources for computer-based services (e.g., remote network resources). The remote computer 104 may host the computer resources and may manage access to the computer resources.

Figure 2A:
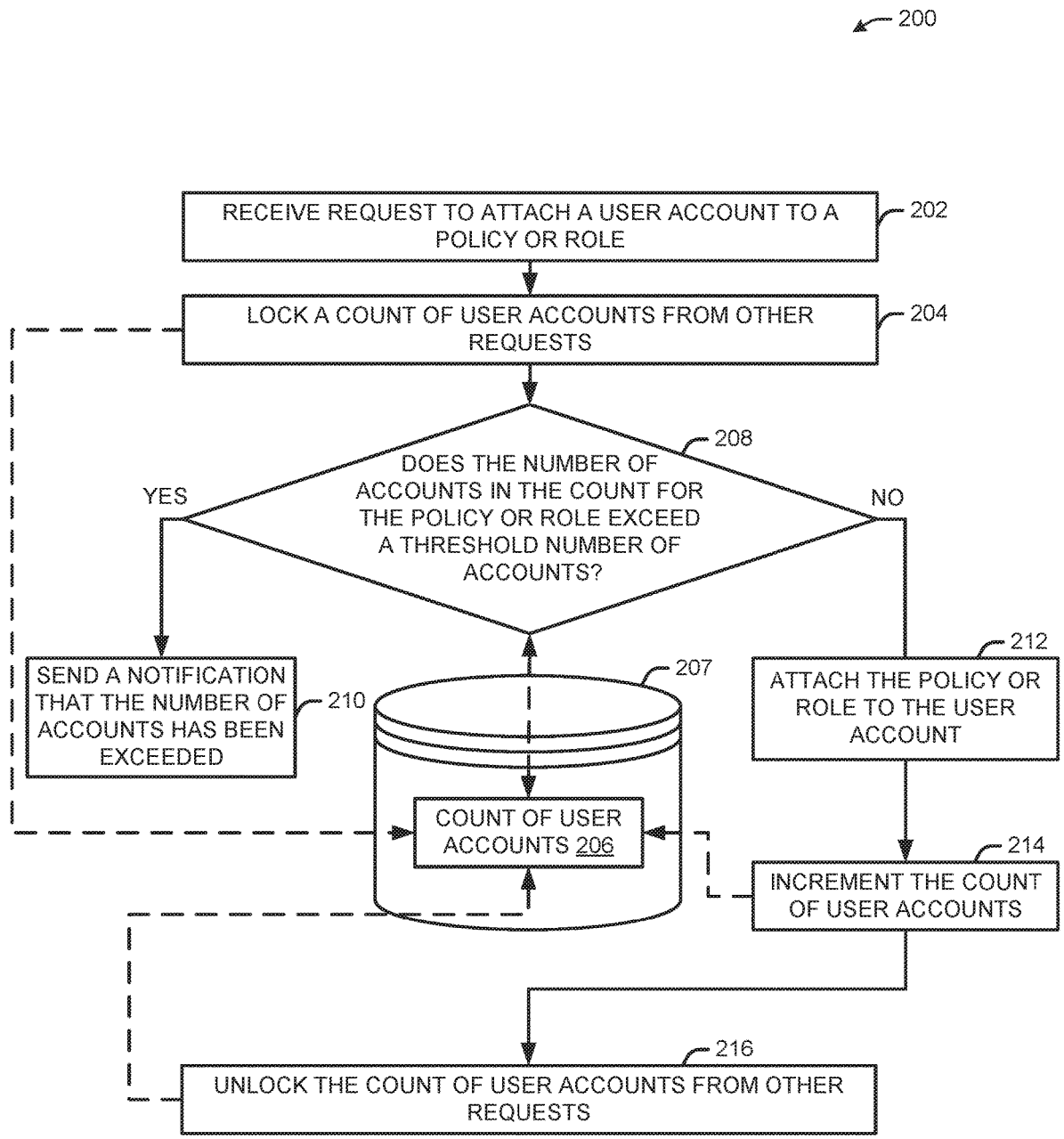
FIG. 2A illustrates an example process for using a computer resource usage count, in accordance with one or more example embodiments of the present disclosure.

FIG. 2A illustrates an example process 200 for using a computer resource usage count, in accordance with one or more example embodiments of the present disclosure.

At block 202, a system (e.g., the remote computer 104 of FIG. 1) may receive a request to attach a user account to a policy or role. The system may receive multiple requests from multiple user devices (e.g., user device 102, user device 108 of FIG. 1) to create user accounts, remove user accounts, add user accounts to a policy or role, remove user accounts from a policy or role, create policies or roles, remove policies or roles, and the like.

At block 204, the system may lock a count of user accounts from other requests. For example, a count of user accounts may be stored in a database 207. The count of user accounts may be represented by a table. For example, a count table may be used to keep track of computer resource usage, such as the number of principal user accounts using a particular policy, or the policy usage for a particular domain. Multiple application programming interfaces (APIs) may write to the count table as policies and roles are updated. For example, APIs may receive requests to attach a role to an account, detach role from an account, attach a policy to an account, detach a policy from an account, create a user account, create a role, delete a role, create a policy, delete a policy, and the like. As accounts are attached to or detached from a role or policy, the count table may be updated to reflect information such as the corresponding domain name, the policy or role identifier, the policy version, etc. While the request to attach the user account to a policy or role is being processed, the system may lock access to the count table, preventing other tasks responding to requests from accessing the count table to determine whether to allow a request or not.

At block 208, the system may determine whether the number of accounts in the count for the policy or role exceeds a threshold number of accounts (e.g., a quota or limit). The system may access the count of user accounts 206 and may determine whether the count indicates that the number of user accounts for the policy or role is within the maximum number of accounts allowed for the policy or role. When the count indicates that adding the account to the policy or role would result in a number of accounts exceeding the limit, the process 200 may continue at block 210, where the system may send a notification that the number of accounts has been exceeded and that the account will not be added to the role or policy. The system may roll back the process. When the count indicates that adding the account to the policy or role would not result in a number of accounts exceeding the limit, the process 200 may continue at block 212, where the system may attach the user account to the policy or role as requested.

At block 214, the system may update the count (e.g., by incrementing the count) to reflect the addition of the account to the role or policy. Once the request has been processed and the count has been updated, the system may, at block 216, unlock the count of user accounts, allowing other requests which require access to the count to be accessed.

Figure 2B:
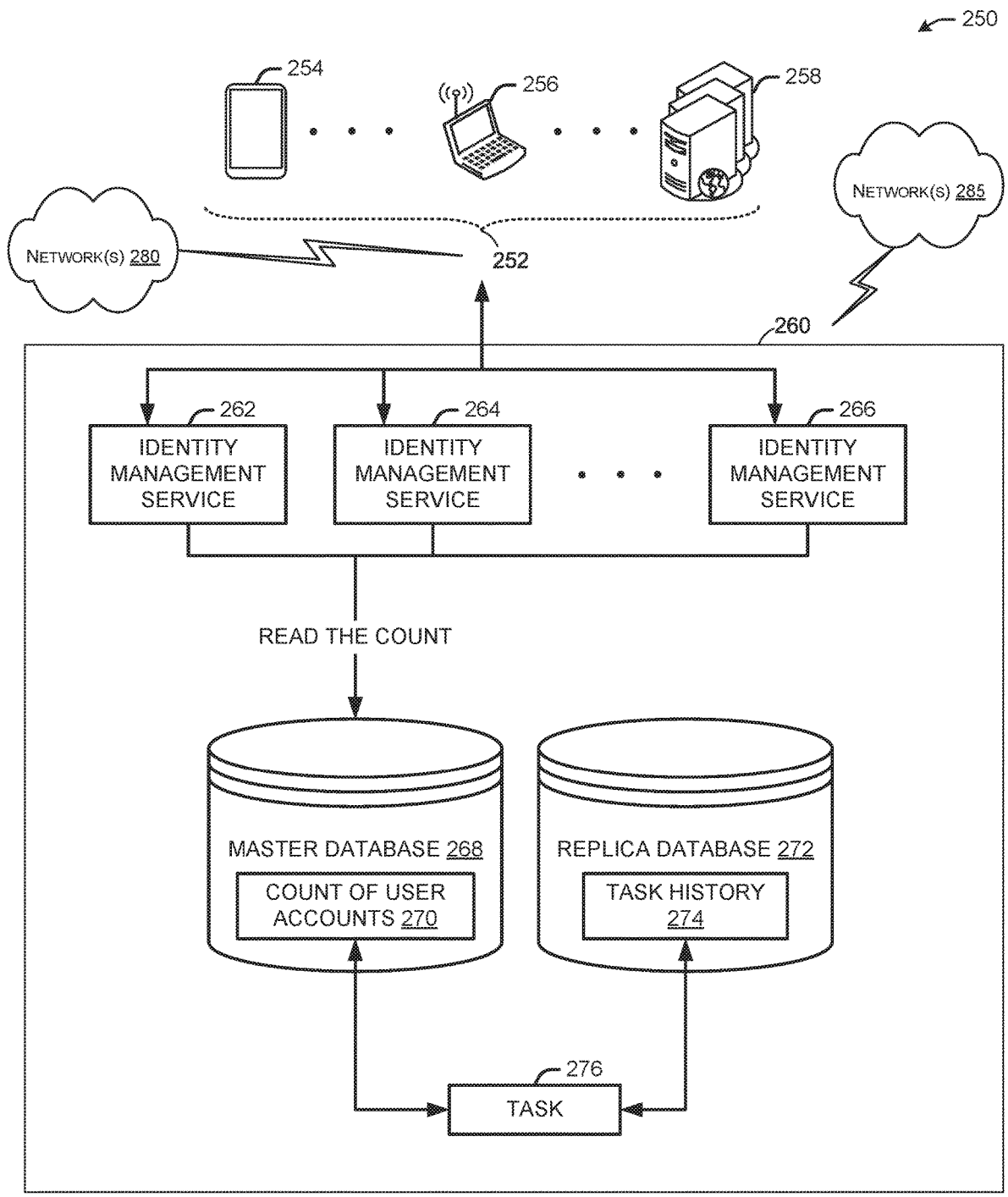
FIG. 2B illustrates an example system for unblocking a computer resource usage count, in accordance with one or more example embodiments of the present disclosure.

FIG. 2B illustrates an example system 250 for unblocking a computer resource usage count, in accordance with one or more example embodiments of the present disclosure.

Referring to FIG. 2B, the system 250 may include one or more user devices 252, such as user device 254, user device 256, and user device 258. The one or more user devices 252 may access a remote computer system 260 (e.g., the remote computer 104 of FIG. 1), which may include one or more identity management services (e.g., identity management service 262, identity management service 264, identity management service 266). The identity management services may receive requests from the one or more user devices 252, such as requests to attach or detach user accounts to and from policies or roles, create or delete policies or roles, create or delete user accounts, and the like. The identity management services may access a master database 268 to access a count of user accounts 270, which may be represented by a count table as described previously. The count may be updated based on a task history 274, which may be stored in the master database 268 or in a replica database 272. When a task 276 is initiated, such as a task to update a policy or role based on a user account, the task may be logged in the task history 274, and the count of user accounts 270 may be updated to indicate when an account is added to or removed from a policy or role.

In one or more embodiments, the one or more user devices 252 may include any suitable processor-driven device including, but not limited to, a mobile device or a non-mobile (e.g., a static) device. For example, the one or more user devices 252 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list. The one or more user devices 252, such as the user device 258, may be a server or a remote computer.

In one or more embodiments, the identity management services may be web services for securely controlling access to remote computer resources. The identity management services may manage user accounts, security credentials, and permissions regarding user account access to remote computer resources. When a user account is created, for example, the account may be attached to a role or policy allowing access to defined computer resources such as databases or other storage systems, elastic computing, serverless computers, and other computer-based resources. When a user account attempts to access a computer-based resource, the identity management services may verify that the user account is permitted by a role or policy to perform the requested action. The identity management services may receive API calls from the one or more user devices 252, which may be distinct APIs for different types of requests. The requests may include an indication of the user account making the request, and the identity management services may determine whether the user account is permitted, based on a role or policy, to perform the requested action (e.g., reading from, writing to, creating resources, etc.).

Any of the communications networks 280 and/or 285 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 280 and/or 285 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 280 and/or 285 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The remote computer system 260 may receive and process requests associated with user accounts, roles, and policies. For example, the identity management service 262 may receive a first user account request (e.g., according to step 106 of FIG. 1) and the identity management service 264 may receive a second user account request (e.g., according to step 110 of FIG. 1). While the identity management service 262 processes the first request, the identity management service 262 may lock access to the count of user accounts 270 in the master database 268, preventing the identity management service 264 from accessing the count of user accounts 270 until the count is unlocked (e.g., after being updated to reflect the first request). To avoid such locking, additional processes are described below.

Figure 3A:
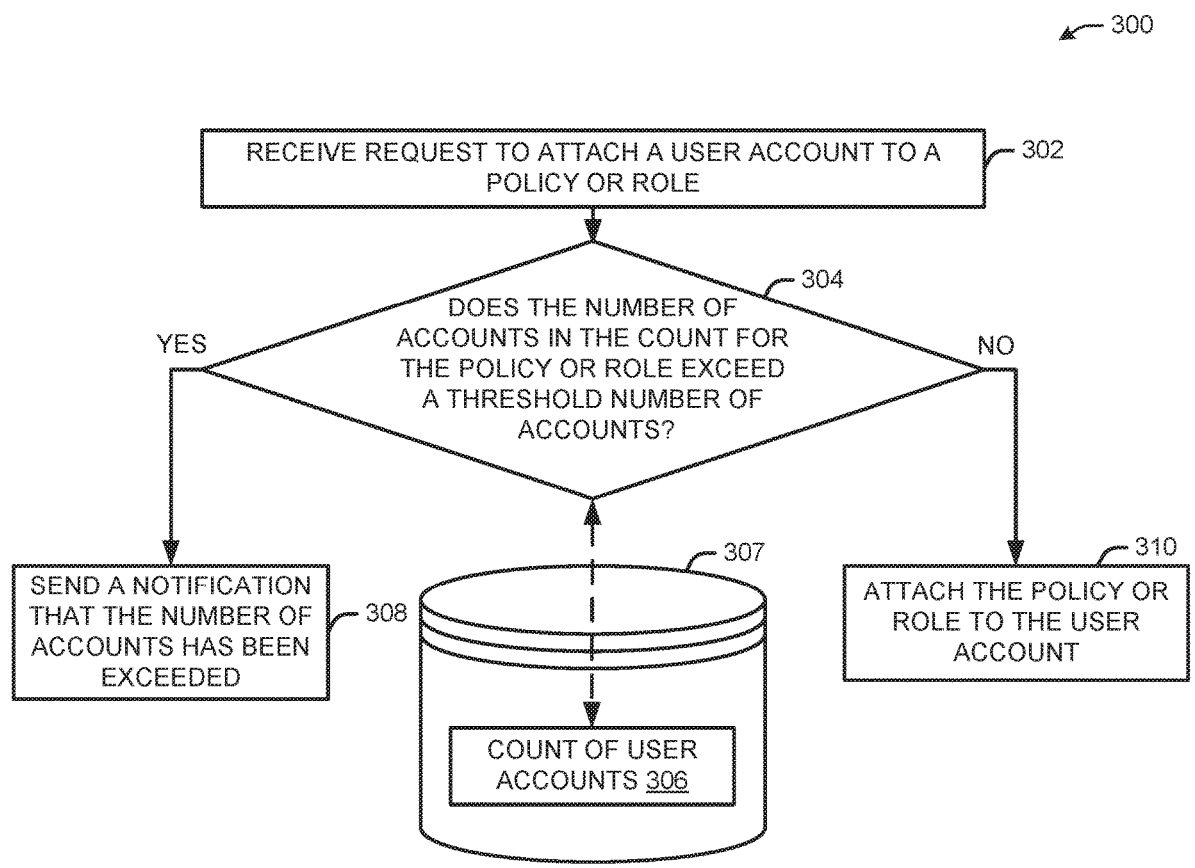
FIG. 3A illustrates an example process for using a computer resource usage count, in accordance with one or more example embodiments of the present disclosure.

FIG. 3A illustrates an example process 300 for using a computer resource usage count, in accordance with one or more example embodiments of the present disclosure.

At step 302, a system (e.g., the remote computer 104 of FIG. 1, the remote computer system 260 of FIG. 2B) may receive a request to attach a user account to a policy or role. The system may receive multiple requests from multiple user devices (e.g., user device 102, user device 108 of FIG. 1, the one or more user devices 252 of FIG. 2B) to create user accounts, remove user accounts, add user accounts to a policy or role, remove user accounts from a policy or role, create policies or roles, remove policies or roles, and the like.

At block 304, the system may determine whether the number of accounts in the count for the policy or role exceeds a threshold number of accounts (e.g., a quota or limit). The system may access a count of user accounts 306 (e.g., in a database 307) and may determine whether the count indicates that the number of user accounts for the policy or role is within the maximum number of accounts allowed for the policy or role. When the count indicates that adding the account to the policy or role would result in a number of accounts exceeding the limit, the process 300 may continue at block 308, where the system may send a notification that the number of accounts has been exceeded and that the account will not be added to the role or policy. The system may roll back the process. When the count indicates that adding the account to the policy or role would not result in a number of accounts exceeding the limit, the process 300 may continue at block 310, where the system may attach the user account to the policy or role as requested.

In one or more embodiments, the steps of locking the count, updating the count, and unlocking the count (e.g., block 204, block 214, and block 216 of FIG. 2A) may not be included in the process 300. As such, the process 300 may avoid locking access to the count and delaying other requests from accessing the count. However, to ensure that subsequent requests are considering an updated count (e.g., at block 304), the count may be updated at some time as explained further below.

Figure 3B:
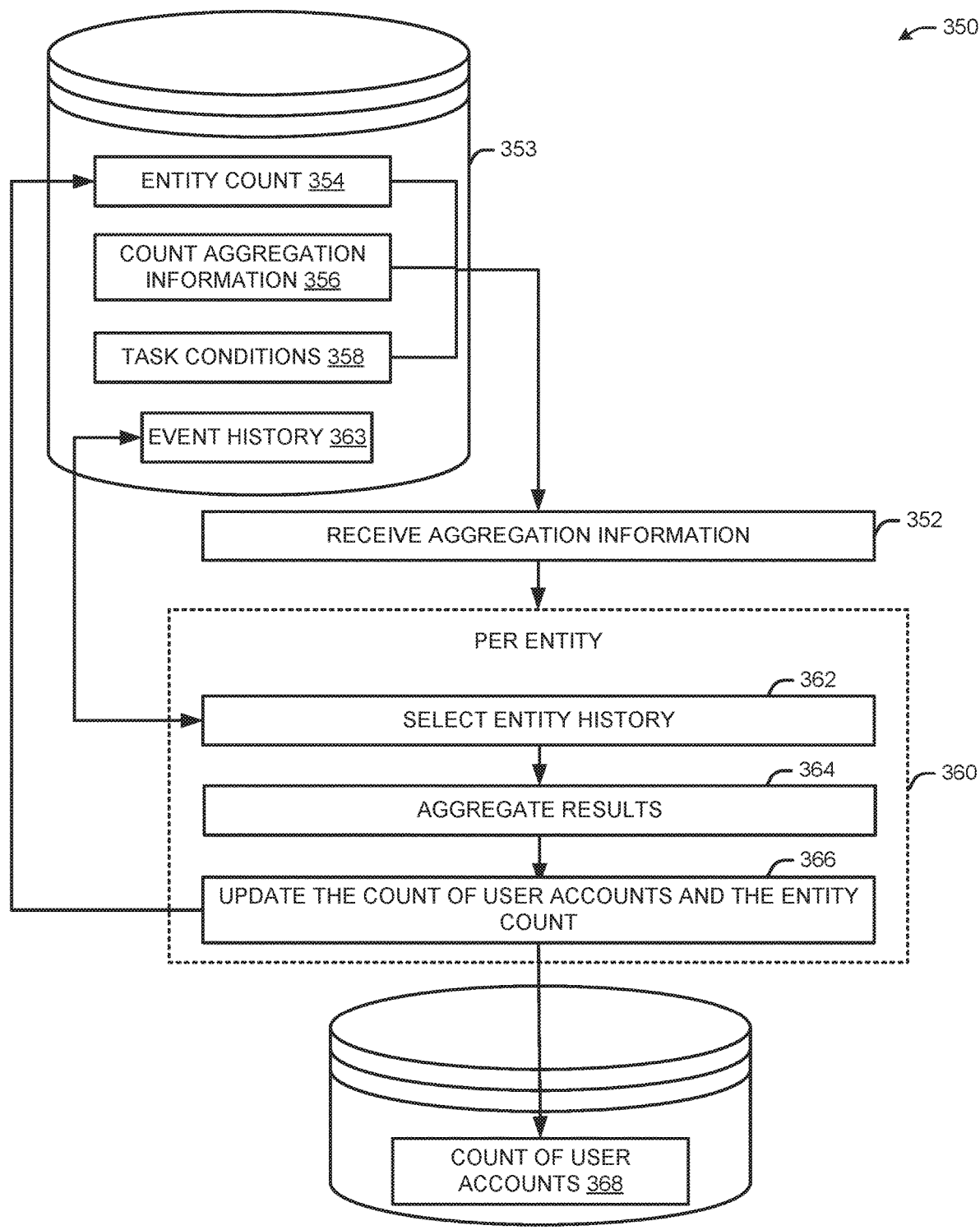
FIG. 3B illustrates an example process for updating a computer resource usage count, in accordance with one or more example embodiments of the present disclosure.

FIG. 3B illustrates an example process 350 for updating a computer resource usage count, in accordance with one or more example embodiments of the present disclosure. The process 350 for updating a computer resource usage count (e.g., the count of user accounts 306 of FIG. 3A) may be performed outside of the process 300 of FIG. 3A (e.g., as a background process) as explained further herein.

At block 352, a system (e.g., the remote computer 104 of FIG. 1, the remote computer system 260 of FIG. 2B) may receive aggregation information (e.g., from a database 353). The aggregation information may include data from one or more tables. For example, the aggregation information may include an entity count 354, which may include information from one or more tables indicating an entity identifier, an entity type, a last processed history identifier, a source (e.g., history, a particular message, etc.) and other information related to entities having user accounts. The aggregation information may include count aggregation information 356, which may include information from one or more tables indicating a task identifier associated with a task (e.g., to attach or detach a user account). The aggregation information may include task conditions 358, which may include information from one or more tables indicating task identifiers associated with respective tasks, the condition of a task (e.g., whether a task associated with adding or removing a user account was permitted), and other information. The system may perform an aggregation process 360 per entity (e.g., specific to respective entities indicated by the aggregation information).

In one or more embodiments, aggregation may be performed at a periodic rate. For example, the system may read all count update events every second (or some other time), and may update the count accordingly. Each read may have a maximum number of events as a parameter. For example, when events are read, the system may read a maximum of number of events (e.g., 500 events). When less than the maximum number of events are pending, the system may read all of the events. When more than the maximum number of events are pending, the remaining events exceeding the maximum number of events may be left for the next round of processing.

In one or more embodiments, aggregation may limit the number of writes to a database storing the count. For example, the system may read events every second (or another time period). Based on the prior aggregation read, the system may process the events in bulk and may determine how many of the events result in writes to one or more counts. The system may have a limited number of writes per time period. For example, if the prior aggregation read results in writes to 25 counts (e.g., updates to 25 counts) and the system is limited to 20 writes/second, the system may perform 20 of the 25 writes in one pass, and may keep the remaining five writes in a database, buffer, or other storage to be written with the next batch of writes. The remaining writes may be aggregated further if subsequent writes are detected for the same counts. For example, if another 300 events are processed in a subsequent batch of events, and after the system aggregates the pending writes with the writes detected in the 300 events, the system may determine the number of counts that need to be updated. When the writes are less than the maximum writes per unit time, the system may perform the writes by updating the counts.

At block 362, for a respective entity, the system may select an entity history from one or more tables representing event history 363. For example, the one or more tables may include a list of events and their respective history identifiers. The events may indicate the record of events that occurred with respect to a policy or role, such as adding or removing a user account, creating a user account, adding or deleting policies or roles, etc. The logging of event history identifiers is described further below with regard to FIG. 4. The system may use the last processed history identifier of the aggregation information to determine the identifier corresponding to the last event that was considered for a count of user accounts 368. The system may determine whether the event history 363 includes any event history identifiers whose identifiers (e.g., numbers and/or letters) are higher than the last processed history identifier, as such may indicate that the event history 363 includes events that have not been accounted for in the count of user accounts 368. Events may be identity management events such as the attachment or detachment of accounts to/from policies, and/or may include other types of events which may be evaluated for their impact on the count of user accounts 368. The unprocessed event history identifiers may be mapped to the aggregation data to determine whether the corresponding events resulted in updates to the count of user accounts 368 which need to be counted. For example, when a new user account is attached to or detached from the count of user accounts 368, the count of user accounts 368 should increment or decrement accordingly.

At block 364, the aggregation process 360 may aggregate results (e.g., based on an aggregation key included in the count aggregation information 356) to determine how many accounts to add to or remove from a role or policy for the respective entity. For any number of entities, the count of user accounts 368 may be updated at block 366 using the aggregated results.

In one or more embodiments, the process 350 may be a process in the background of the process 300 of FIG. 3A so that the count of user accounts 368 is updated periodically or based on a trigger event, such as a request for a sensitive action such as to delete a role or policy as explained further below with respect to FIG. 5A. To update the event history 363 to allow for an update to the count of user accounts 368, events may be logged according to FIG. 4 as described below, even if the count of user accounts 368 is not updated for each request within the process 300 of FIG. 3A (e.g., resulting in the locking of the count of user accounts 368 for other processes).

Figure 4:
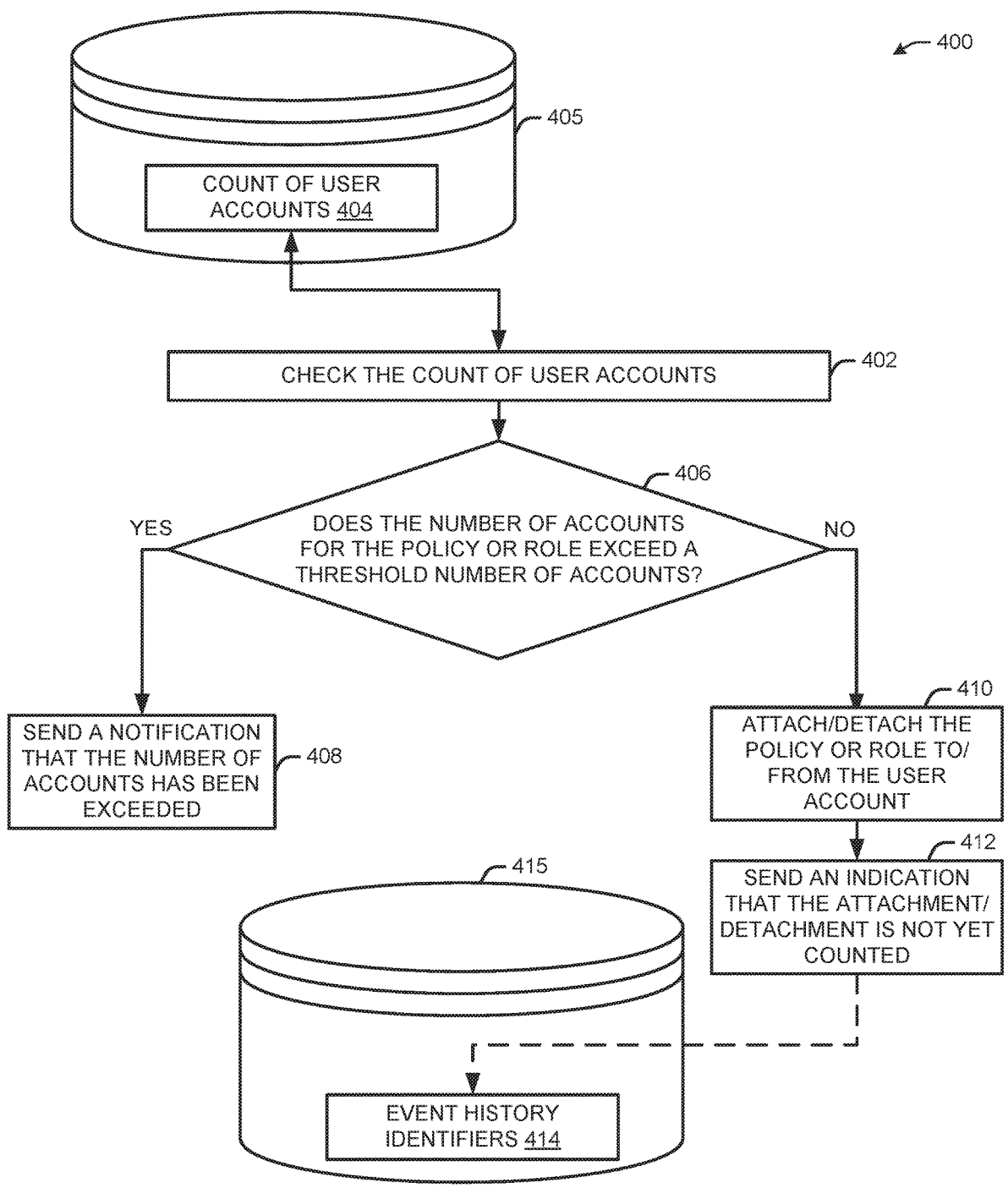
FIG. 4 illustrates an example process for using a computer resource usage count, in accordance with one or more example embodiments of the present disclosure.

FIG. 4 illustrates an example process 400 for using a computer resource usage count, in accordance with one or more example embodiments of the present disclosure.

At block 402, a system (e.g., the remote computer 104 of FIG. 1, the remote computer system 260 of FIG. 2B) may check the count of user accounts 404, which may be stored as a table in a database 405 or other storage. For example, a count table may be used to keep track of computer resource usage, such as the number of principal user accounts using a particular policy, or the policy usage for a particular domain. Multiple application programming interfaces (APIs) may write to the count table as policies and roles are updated. For example, APIs may receive requests to attach a role to an account, detach role from an account, attach a policy to an account, detach a policy from an account, create a user account, create a role, delete a role, create a policy, delete a policy, and the like. As accounts are attached to or detached from a role or policy, the count table may be updated to reflect information such as the corresponding domain name, the policy or role identifier, the policy version, etc. While the request to attach the user account to a policy or role is being processed, the system may lock access to the count table, preventing other tasks responding to requests from accessing the count table to determine whether to allow a request or not.

At block 406, the system may determine whether the number of accounts in the count of user accounts 404 indicates that the number of user accounts for the policy or role is within the maximum number of accounts allowed for the policy or role. When the count of user accounts 404 indicates that adding a user account to a policy or role would result in a number of accounts exceeding a quota or limit (e.g., the threshold), the process 400 may continue at block 408, where the system may send a notification that the number of accounts has been exceeded and that the account will not be added to the role or policy. The system may roll back the process. When the count indicates that adding an account to the policy or role would not result in a number of accounts exceeding the limit, the process 400 may continue at block 410, where the system may attach the user account to the policy or role when requested.

At block 412, the system may send an indication that an action (e.g., user account attachment, user account detachment, etc.) is not yet counted. For example, when the count of user accounts 404 is not updated in the process of responding to a request for an action associated with a policy or role, the system may send a flag or another type of indication in a message to indicate that a record corresponding to an event history identifier has not yet been counted. For example, a flag or other indicator may indicate that the count of user accounts 404 is not based on the events whose event history identifiers 414 (e.g., stored in a database 415 or other storage) are greater than a last processed history identifier used by the system to determine whether any event history identifiers subsequent to (e.g., greater than) the last processed history identifier are not included in the count of user accounts 404. The process 350 of FIG. 3B, when receiving aggregation information at block 352, may receive an indication of the source of information (e.g., from the entity count 354), which may indicate that the source is the message with the flag or other indicator. When the flag or indicator indicates that the count of user accounts 404 is not updated, the process 350 of FIG. 3B may process the history identifiers of records from the source indicated (e.g., the message), may identify the history identifiers in the message corresponding to the uncounted actions, and may fetch the corresponding event history records from an event history (e.g., the event history 363 of FIG. 3B). Using the event history, the system may update the count according to attached and detached user accounts since the last processed history identifier. The system may log the actions with the event history identifiers 414 in the event history 363 of FIG. 3B so that the corresponding identifiers indicated in the message with the flag or other indicator may be mapped to the event history 363 of FIG. 3B to identify the actions corresponding to changes to the count.

Figure 5A:
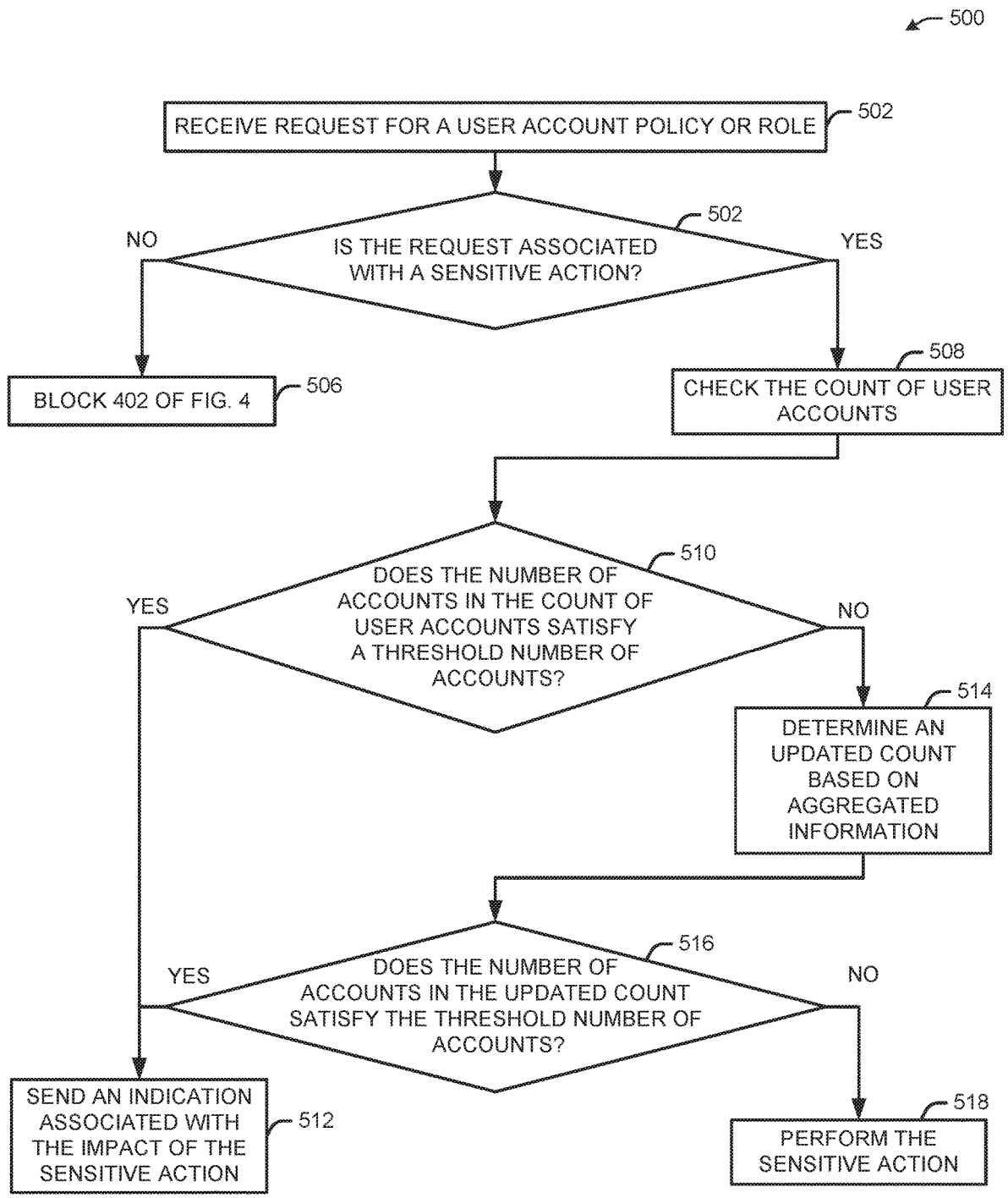
FIG. 5A illustrates an example process for using a computer resource usage count, in accordance with one or more example embodiments of the present disclosure.

FIG. 5A illustrates an example process 500 for using a computer resource usage count, in accordance with one or more example embodiments of the present disclosure.

At block 502, a system (e.g., the remote computer 104 of FIG. 1, the remote computer system 260 of FIG. 2B) may receive a request to attach a user account to a policy or role. The system may receive multiple requests from multiple user devices (e.g., user device 102, user device 108 of FIG. 1, the one or more user devices 252 of FIG. 2B) to create user accounts, remove user accounts, add user accounts to a policy or role, remove user accounts from a policy or role, create policies or roles, remove policies or roles, and the like.

At block 502, the system may determine whether the request is associated with a sensitive action or a non-sensitive action. Whether a request is associated with a sensitive or non-sensitive action may be preset or indicated by a user (e.g., in the request or in another input). For example, a sensitive action may include deleting a policy, as policy deletion may affect a significant number of user accounts attached to the policy (e.g., all of the user accounts). Other types of sensitive actions may include group addition or deletion. A non-sensitive action may include attaching a user account to a policy or role, or detaching a user account from a policy or role. A non-sensitive action may become sensitive, and therefore may be considered sensitive, when the count reaches a threshold number of accounts from a quota or limit. When the request is not associated with a sensitive action, the process 500 may continue at block 402 of FIG. 4, and the system may continue with the process 400 of FIG. 4 to process the request without updating the count of user accounts for the policy. When the request is associated with a sensitive action, the process 500 may continue to block 508, wherein the system may check the count of user accounts. The count of user accounts at this point may not be updated. In particular, the count may be based on multiple aggregated actions determined based on event history (as explained with regard to FIG. 3B and further below with regard to FIG. 5B), but may not have accounted for multiple recent actions occurring since a last processed event. A sensitive request may require use of a strongly consistent count, so when the count is not updated in response to each request, the system may need to perform the aggregation process explained with regard to FIG. 3B to make sure that the count is updated. However, to limit when the strongly consistent count is used (e.g., in a strongly consistent count mode), the system may use the existing count (even if outdated) in block 508. When the request is associated with a non-sensitive action, an eventually consistent count may be used (e.g., the eventually consistent count mode described with regard to process 400 of FIG. 4 in which the count is not updated after each addition or detachment of an account).

At block 510, the system may determine whether the number of accounts in the count of user accounts satisfies a threshold number of accounts. This threshold may be different than the threshold representing the limit or quota on the number of accounts allowed to attach to a policy. In particular, the threshold may be used when a strongly consistent count mode is triggered (e.g., when block 502 results in a determination that the action requested is sensitive and requires a strongly consistent count). The threshold may be set to ensure that the number of user accounts that would be affected by permitting the sensitive request would be small (e.g., only a few user accounts would be impacted by deleting a policy). When the system determines that the current count indicates that the number of user accounts in the count exceed the threshold, the process 500 may continue to block 512 where the system may send one or more indications indicative of the impact of the sensitive action (e.g., the number of accounts that would be impacted, that the number of accounts exceeds a threshold number, that the request cannot be permitted, etc.). When the system determines that the current count does not exceed the threshold number, the process 500 may continue to block 514. Whether the number of accounts in the count satisfies the threshold may depend on the count and the requested action. For example, a threshold may be used to ensure that a number of accounts does not exceed limit, or that a number of accounts remains above a limit.

At block 514, the system may determine an updated count based on aggregated information (e.g., as described with respect to FIG. 3B and further below with respect to FIG. 5B). The updated count may include changes made to the current count based on multiple actions (e.g., multiple increments and/or decrements based on the number of user accounts attached or detached to a policy since the last processed event on which the current count is based). In this manner, the aggregation of event information to ensure the most updated count may be limited to situations in which the requested action is sensitive and in which the requested action is likely to affect a small number of user accounts.

At block 516, the system may determine whether the number of accounts in the updated count satisfies the threshold number of accounts. In this manner, the system may verify that the updated count in a strongly consistent count mode indicates that the number of accounts impacted by the sensitive action would be below the threshold number of accounts (e.g., when desirable for an action to effect few or no accounts) or above a threshold number of accounts (e.g, when an action should take place if it affects a certain number of accounts, or when an action should not result in too few accounts being in a count). When the updated count indicates that the number of affected accounts would satisfy the threshold number, the process 500 may proceed to block 512. When the updated count indicates that the number of affected accounts would not exceed the threshold number, the process 500 may continue to block 518.

At block 518, the system may perform the sensitive action, such as removing the policy. When a sensitive action includes modifying the number of accounts attached to a policy the system may update the count of user accounts. Referring to when the requested action is sensitive, the process 500 optionally may lock the count of user accounts until after the process 500 is complete.

Figure 5B:
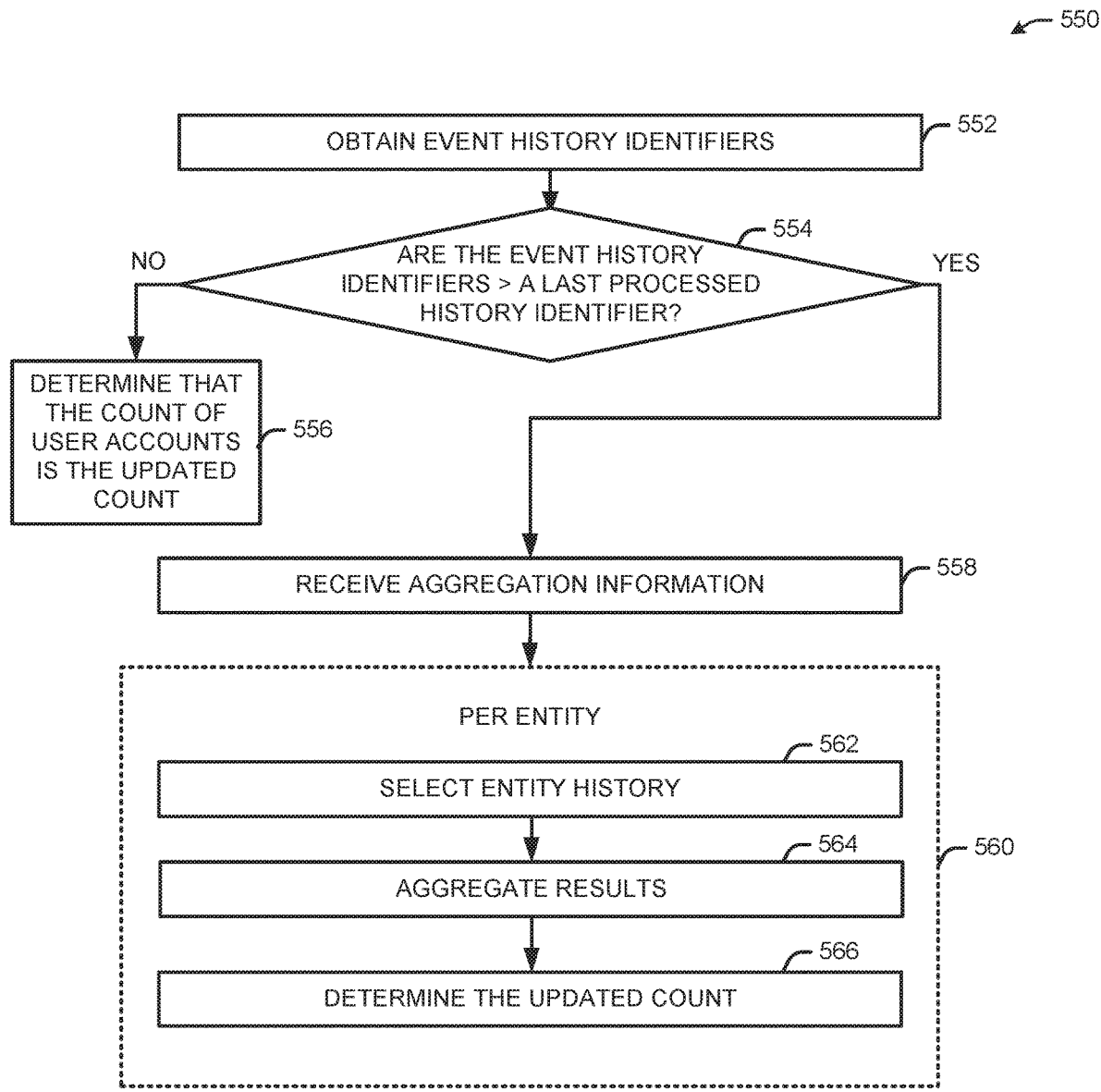
FIG. 5B illustrates an example process for updating a computer resource usage count, in accordance with one or more example embodiments of the present disclosure.

FIG. 5B illustrates an example process 550 for updating a computer resource usage count, in accordance with one or more example embodiments of the present disclosure. The process 550 may refer at least in part to determining the updated count in block 514 of FIG. 5A.

At block 552, a system (e.g., the remote computer 104 of FIG. 1, the remote computer system 260 of FIG. 2B) may obtain event history identifiers (e.g., from the event history identifiers 414 of FIG. 4). When the count is not updated after an action that alters the number of user accounts attached to a policy, the system may add an event history identifier to an event history (e.g., the event history 363 of FIG. 3B). The event history identifiers may be sent from a task or process (e.g., the process 400 of FIG. 4) and received by another process (e.g., at block 552). The event history identifiers may map to an event history which may indicate the updates made to the policy with regard to user accounts. In particular, the system may map an event history identifier to the event history identifier in the event history. In this manner, the device may provide bulk aggregation of multiple events that may have occurred since the last time a count was updated. The bulk aggregation of events may occur periodically, based on when the number of events exceeds a threshold number of events, and/or when the load (e.g., an amount of traffic) on the database or storage of the events reaches a certain level or to maintain a load within a certain range. The bulk aggregation may be triggered based on consideration of how long the system may tolerate the count potentially being inaccurate, and based on how long it may take to process the events. For example, constant updating may be resource-intensive, but waiting too long to update the count may result in the count being inaccurate for decisions based on the count, and may result in a long queue of events that need to be processed, thereby resulting in a longer bulk aggregation time required to update the count.

At block 554, the system may determine whether the event history identifiers are greater than a last processed history identifier, which may indicate the identifier of the last event accounted for by the count. In this manner, only events which have not been accounted for in the count may be processed in a bulk update of the count. The last processed history identifier may be included in the count aggregation information 356 of FIG. 3B. When the event history identifier received by the system in the process 500 maps to an event history identifier in the event history that is less than or equal to the last processed history identifier, the process 500 may continue to block 556, where the system may determine that the count is updated (e.g., that block 516 of FIG. 5A is not needed because the previously considered count at block 510 was updated, and therefore the process 500 of FIG. 5A may proceed to block 518). When the event history identifier received by the system in the process 500 maps to an event history identifier in the event history that is greater than the last processed history identifier, the process 500 may continue to block 558, where the system may perform the aggregation process.

At block 558, the system may receive aggregation information. The aggregation information may include data from one or more tables. For example, the aggregation information may include the entity count 354 of FIG. 3B, which may include information from one or more tables indicating an entity identifier, an entity type, a last processed history identifier, a source (e.g., history, a particular message, etc.) and other information related to entities having user accounts. The aggregation information may include the count aggregation information 356 of FIG. 3B, which may include information from one or more tables indicating a task identifier associated with a task (e.g., to attach or detach a user account). The aggregation information may include the task conditions 358 of FIG. 3B, which may include information from one or more tables indicating task identifiers associated with respective tasks, the condition of a task (e.g., whether a task associated with adding or removing a user account was permitted), and other information. The system may perform an aggregation process 560 per entity (e.g., specific to respective entities indicated by the aggregation information).

At block 562, for a respective entity, the system may select an entity history (e.g., from one or more tables representing the event history 363 of FIG. 3B). For example, the one or more tables may include a list of events and their respective history identifiers. The events may indicate the record of events that occurred with respect to a policy or role, such as adding or removing a user account, creating a user account, adding or deleting policies or roles, etc. The logging of event history identifiers is described further below with regard to FIG. 4. The system may use the last processed history identifier of the aggregation information to determine the identifier corresponding to the last event that was considered for a count of user accounts. The system may determine whether the event history includes any event history identifiers whose identifiers (e.g., numbers and/or letters) are higher than the last processed history identifier, as such may indicate that the event history includes events that have not been accounted for in the count of user accounts. The unprocessed event history identifiers may be mapped to the aggregation data to determine whether the corresponding events resulted in updates to the count of user accounts which need to be counted. For example, when a new user account is attached to or detached from the count of user accounts, the count of user accounts should increment or decrement accordingly.

At block 564, the aggregation process 560 may aggregate results (e.g., based on an aggregation key included in the count aggregation information 356 of FIG. 3B) to determine how many accounts to add to or remove from a role or policy for the respective entity. For any number of entities, the count of user accounts may be updated at block 566 using the aggregated results.

Referring to FIG. 3B and FIG. 5B, when aggregating the information per entity, the system may map the entity type (e.g., included in the entity count 354 of FIG. 3B) to the aggregation information (e.g., the count aggregation information 356 of FIG. 3B) using matching identifiers. For a given entity, the system may identify a table of information indicated by the entity type. The system may select the corresponding history for the entity type and may aggregate the results based on uncounted events, may update the last processed identifier, and may update the count based on aggregated results.

Referring to FIG. 2B, the tasks associated with uncounted events may be kept in another table (not shown) in the master database 268 so that, for example, the task history 274 does not need to be read from the replica database 272.

The example embodiments described above are not meant to be limiting.

Figure 6:
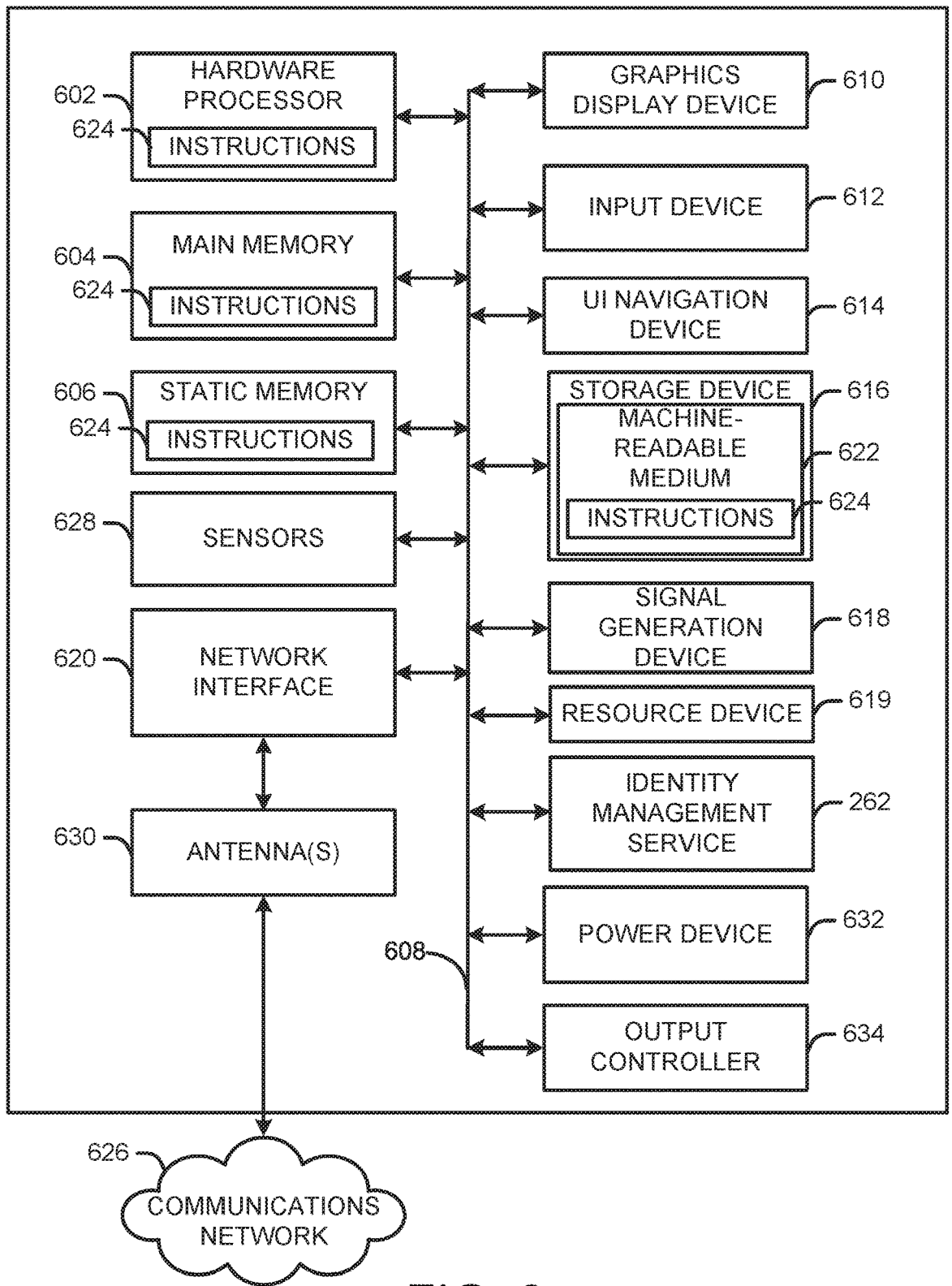
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., implemented in whole or in part by the remote computer 104 of FIG. 1, the user device 102 of FIG. 1, the user device 108 of FIG. 1, the remote computer system 260 of FIG. 2B, the one or more user devices 252 of FIG. 2B) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P) (or other distributed) network environments. The machine 600 may be a device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include any combination of the illustrated components. For example, the machine 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618, a resource device 619, a network interface device/transceiver 620 coupled to antenna(s) 630, one or more sensors 628, and/or the identity management service 262 of FIG. 2. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The resource device 619 may carry out or perform any of the operations and processes (e.g., process 200 of FIG. 2A, process 300 of FIG. 3A, process 350 of FIG. 3B, process 400 of FIG. 4, process 500 of FIG. 5A, process 550 of FIG. 5B) described and shown above.

In one or more embodiments, the resource device 619 may be implemented as a user device or server (e.g., the user device 102 of FIG. 1, the user device 108 of FIG. 1, the one or more user devices 252 of FIG. 2B) used to request policy or role changes through one or more APIs. The resource device 619 may send a request to attach a user account to a policy or role. The request may be to create user accounts, remove user accounts, add user accounts to a policy or role, remove user accounts from a policy or role, create policies or roles, remove policies or roles, and the like.

In one or more embodiments, the resource device 619 may be implemented as a remote computer providing access to remote computer resources (e.g., the remote computer 104 of FIG. 1, the remote computer system 260 of FIG. 2B). The resource device 619 may provide web services for securely controlling access to remote computer resources. The identity management services may manage user accounts, security credentials, and permissions regarding user account access to remote computer resources. When a user account is created, for example, the account may be attached to a role or policy allowing access to defined computer resources such as databases or other storage systems, elastic computing, serverless computers, and other computer-based resources. When a user account attempts to access a computer-based resource, the resource device 619 may verify that the user account is permitted by a role or policy to perform the requested action. The resource device 619 may receive API calls from one or more user devices (e.g., the one or more user devices 252 of FIG. 2B), which may be distinct APIs for different types of requests. The requests may include an indication of the user account making the request, and the identity management services may determine whether the user account is permitted, based on a role or policy, to perform the requested action (e.g., reading from, writing to, creating resources, etc.).

In one or more embodiments, the resource device 619 may rely on eventually consistent counts in some situations and rely on strongly consistent counts in other situations. To prevent the dissemination of outdated information while an update is being propagated, a strongly consistent count may require a system to prevent (e.g., block) access to the information in one location until the information has been updated. Therefore, strong consistency provides more accurate, updated information, but often with more latency than use of eventual consistency. Accordingly, the resource device 619 may apply a strongly consistent count in limited circumstances to reduce latency associated with updated information and retrieving updated information in response to requests, for example.

In one or more embodiments, the resource device 619 may implement an eventually consistent count of user accounts except when evaluating requests for performance of sensitive actions (e.g., policy deletion). Using an eventually consistent count may allow for processing account requests without requiring retrieval and evaluation of a count of user accounts in response to every request to add or remove a user, role, or policy (e.g., to/from an account). As such, the lag time for processing such requests may be reduced (e.g., by avoiding locking a resource until a request has been fully processed). To avoid performance of sensitive actions, the resource device 619 may implement a strongly consistent count in response to certain requests such as deleting a role, user, or policy.

In one or more embodiments, when using an eventually consistent account, the resource device 619 may read an event stream (e.g., including information regarding requests), and may aggregate the results of requested events to update respective counts of user accounts. In this manner, the number of write requests/locks may be reduced by removing the count updating (e.g., propagation) from the process flow associated with performing an account action.

In one or more embodiments, the resource device 619 may identify a type of request being made as a sensitive action. When the action or active programming interface used to receive a requested action is identified as sensitive, the resource device 619 may determine whether the count of user accounts for a role or policy is less than a threshold number of accounts. The threshold number of accounts being below the threshold number of accounts may be indicative of a small number of accounts being affected by the requested action (e.g., a policy deletion). When too many accounts may be affected by a requested action that is deemed sensitive, the resource device 619 may deny the request. When a small enough number of accounts may be affected, the resource device 619 may use a strongly consistent count to determine whether the most updated count will allow for the action to be performed. For example, the resource device 619 may check for pending actions to consider when updating the count before determining whether a request would violate or comply with the count. In this manner, the delay that may be associated with using a strongly consistent count may be incurred only when a count is near zero so that the performance impact of processing account requests is minimized.

It is understood that the above are only a subset of what the resource device 619 may be configured to perform and that other functions included throughout this disclosure may also be performed by the resource device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radiotelephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
receiving a request associated with adding a user account to a user account policy;
obtaining a count indicative of a number of user accounts associated with the user account policy;
determining, based on the obtained count, that the number of user accounts fails to exceed a first threshold number of user accounts;
adding the user account to the user account policy;
generating, after adding the user account to the user account policy, an indication that the number of user accounts does not indicate that the user account has been added to the user account policy;
receiving a request associated with deleting the user account policy;
determining, based on the obtained count, that the number of user accounts fails to exceed a second threshold number of user accounts, wherein the second threshold is less than the first threshold;
obtaining an event history comprising the generated indication;
determining, based on the obtained event history, an updated count;
determining that the updated count fails to exceed the second threshold; and
deleting the user account policy.

2. The method of claim 1, wherein the generated indication comprises a first event identifier, wherein determining the updated count comprises:
determining that the obtained event history comprises the first event identifier;
determining a last processed event identifier;
determining that the first event identifier is greater than the last processed event identifier; and
incrementing the number of user accounts.

3. The method of claim 1, wherein the received request associated with adding the user account to the user account policy is a first received request associated with adding a first user account to the user account policy, further comprising:
receiving a second request associated with adding a second user account to the user account policy;
obtaining the count;
determining, based on the obtained count, that the number of user accounts fails to exceed the first threshold number of user accounts;
adding the second user account to the user account policy; and
generating, after adding the second user account to the user account policy, an indication that the number of user accounts does not indicate that the second user account has been added to the user account policy.

4. The method of claim 1, wherein the user account is a first user account, wherein the generated indication that the number of user accounts does not indicate that the first user account has been added to the user account policy is a first generated indication that the number of user accounts does not indicate that the first user account has been added to the user account policy, wherein the obtained event history comprises a second indication that the number of user accounts does not indicate that a second user account has been added to the user account policy, and wherein determining the updated count comprises incrementing, based on the received request associated with deleting the user account policy, the number of user accounts at least twice.

5. A method, comprising:
receiving a request associated with a user account and a user account policy;
obtaining a count indicative of a first number of user accounts associated with the user account policy, wherein the count is based on a first aggregation of two or more actions associated with the user account policy;
determining, based on the obtained count, that the first number of user accounts is less than a threshold number of user accounts;
identifying an indication that the count excludes an action that occurred;
obtaining, based on the identified indication, an event history;
determining that the event history comprises a second number of user accounts that is based on a second aggregation of the two or more actions and the action;
determining that the second number of user accounts is less than the threshold number of user accounts; and
updating the user account policy based on the received request.

6. The method of claim 5, wherein the user account is a first user account, and wherein a first action of the two or more actions comprises an addition of a second user account to the user account policy.

7. The method of claim 5, wherein the user account is a first user account, and wherein a first action of the two or more actions comprises a detachment of a second user account from the user account policy.

8. The method of claim 5, wherein the received request is associated with deleting the user account policy, further comprising:
determining, based on the received request, to use a strongly consistent count mode; and
determining the threshold number of user accounts based on the determination to use the strongly consistent count mode.

9. The method of claim 5, wherein the received request is a first received request, wherein the user account is a second user account, further comprising:
receiving a second request associated with adding a second user account to the user account policy;
adding the second user account to the user account policy; and generating, after adding the second user account to the user account policy, an event identifier associated with adding the second user account to the user account policy, wherein the identified indication comprises the event identifier.

10. The method of claim 5, wherein the identified indication comprises a first event identifier, wherein determining the second number of user accounts comprises:
   determining, based on the identified indication, that the obtained event history comprises the first event identifier;
   determining a last processed event identifier;
   determining that the first event identifier is greater than the last processed event identifier, wherein the identified indication is based on the first event identifier being greater than the last processed event identifier; and
   incrementing the first number of user accounts based on the first event identifier being greater than the last processed event identifier.

11. The method of claim 5, wherein determining the second number of user accounts comprises incrementing the first number of user accounts at least twice.

12. The method of claim 5, wherein the user account is a first user account, wherein the aggregated two or more actions are associated with an eventually consistent count mode, further comprising:
   generating a first event identifier associated with a second user account and the user account policy;
   generating a second event identifier associated with a third user account and the user account policy; and
   generating the identified indication, wherein the count lacks basis on the identified indication.

13. The method of claim 5, further comprising updating, based on the identified indication, a last processed history identifier, wherein the last processed history identifier indicates that the second number of user accounts is based on the aggregated two or more actions.

14. The method of claim 5, wherein obtaining the event history comprises:
   determining an entity; and
   determining that the two or more actions are associated with the entity.

15. The method of claim 5, wherein the obtained count is stored in a database, further comprising determining a load associated with the database, wherein obtaining the event history is based on the load.

16. A method, comprising:
   receiving a request associated with a user account and a user account policy;
   obtaining a count indicative of a number of user accounts associated with the user account policy, wherein the count is based on a first aggregation of two or more actions associated with the user account policy;
   determining, based on the obtained count, that the number of user accounts is less than a threshold number of user accounts;
   identify an indication that the count excludes an action that occurred; and
   generating an event identifier associated with the user account and the user account policy.

17. The method of claim 16, further comprising determining that the received request is associated with an eventually consistent count mode, wherein generating the event identifier is based on the determination that the received request is associated with the eventually consistent count mode.

18. The method of claim 16, wherein the received request is a first received request, wherein the user account is a first user account, wherein the number of user accounts is a first number of user accounts, and wherein the threshold number of user accounts is a first threshold number of user accounts, further comprising:
   receiving a second request associated with a second user account and the user account policy;
   determining, based on the obtained count, that the first number of user accounts is less than a second threshold number of user accounts;
   obtaining, based on the indication that the count excludes an action that occurred, an event history, wherein the event history comprises the event identifier;
   determining that the event identifier is greater than a last processed event identifier;
   determining, based on the event identifier, a second number of user accounts that is based on the action that occurred;
   determining that the second number of user accounts is less than the second threshold number of user accounts; and
   updating the user account policy based on the second request.

19. The method of claim 18, wherein determining the second number of user accounts comprises incrementing the first number of user accounts.

20. The method of claim 18, wherein determining the second number of user accounts comprises decrementing the first number of user accounts.

\* \* \* \* \*